United States Patent [19]
Grau et al.

[11] Patent Number: 6,067,093
[45] Date of Patent: *May 23, 2000

[54] METHOD AND APPARATUS FOR ORGANIZING OBJECTS OF A NETWORK MAP

[75] Inventors: Stephen H. Grau, Pleasanton; Stephen Bostock, Morgan Hill, both of Calif.

[73] Assignee: Novell, Inc., Provo, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/698,057

[22] Filed: Aug. 14, 1996

[51] Int. Cl.[7] .................................................. G06T 11/00
[52] U.S. Cl. .......................................................... 345/440
[58] Field of Search ................................... 345/440–443, 345/356, 357

[56] References Cited

U.S. PATENT DOCUMENTS

| | | |
|---|---|---|
| 4,833,592 | 5/1989 | Yamanaka et al. . |
| 5,226,120 | 7/1993 | Brown et al. . |
| 5,247,517 | 9/1993 | Ross et al. ............................... 370/85.5 |
| 5,276,789 | 1/1994 | Besaw et al. . |
| 5,295,244 | 3/1994 | Dev et al. . |
| 5,394,522 | 2/1995 | Sanchez-Frank et al. . |
| 5,412,772 | 5/1995 | Monson . |
| 5,504,863 | 4/1996 | Yoshida . |
| 5,572,640 | 11/1996 | Schettler . |
| 5,619,632 | 4/1997 | Lamping et al. ........................ 345/441 |
| 5,684,967 | 11/1997 | McKenna et al. . |
| 5,715,432 | 2/1998 | Xu et al. . |
| 5,751,965 | 5/1998 | Mayo et al. . |
| B1 4,555,775 | 12/1995 | Pike . |

OTHER PUBLICATIONS

Klarner "The Mathematical Gardner" pp. 205–206 1981.
Catherine J. Smith, Arthur J. Kulakow and Kathleen L. Gannon, "HP OpenView Windows: A User Interface for Network Management Solutions", Hewlett–Packard Journal, Apr. 1990.

Greenstein, Irwin, "Management System Designed For Synoptics Ethernet", 1988 Fairchild Publications, Inc.

Clair, Michael M., "Physical Layer Network Management: the missing link", (local area networks) (Application Note) 1989 Horizon House Publications, Inc.

IBM's NetVIEW/6000 challenges the best. (Network Edition: First Looks) (Software Review) (network management software) (Evaluation), 1993 Ziff–Dvis Publishing Company.

"Open View has more features than the other two products. (Open View Network Node Manager 3.1, network management software from Hewlett–Packard Co.) (Software Review) (one of three evaluations of SNMP–based remote management products in 'Compatibility in Three Consoles') (Simple Network Management Protocol) (Evaluation)," 1992 Ziff–Davis Publishing Company.

NetView/6000 slingshots ahead. (IBM's network management software ahead of HP's HP Open View; IBM licenses technology to DEC, plans to jointly develop new applications), 1993 Cardinal Business Media, Inc.

"Ungermann–Bass OS/2 suite to oversee disparate LANs. (Ungermann–Bass Inc. introduces NetDirector OS/2 package for managing multivendor local area networks) (product announcement)," 1992 Ziff–Davis Publishing Company.

(List continued on next page.)

Primary Examiner—Almis R. Jankus
Attorney, Agent, or Firm—Cesari & McKenna

[57] ABSTRACT

A layout technique generates a compact connected graph of linked objects that is organized on a page basis, i.e., the page comprises a collection of related objects displayed on a single scrollable window. Objects are generally grouped near neighboring objects with whom they share links. The technique further organizes the connected graph as a hub-and-spoke arrangement to reduce the number of overlapping objects and crossing links. Collectively, these layout features facilitate comprehension of the internetwork topology by a user.

20 Claims, 14 Drawing Sheets

OTHER PUBLICATIONS

"LAN/WAN mgmnt: Ungermann–Bass intros multitasking network management system; users commit to new platform. (new multitasking, microcomputer–based NetDirector handles physical management through implementation of client/server architectuer on LAN Manager–based local and wide area networks; beta customers satisfied with and migrate to new physical network management platform) (product announcement)," 1990 Edge Publishing.

"Ungermann–Bass joins the personal computer–based network management fray. (NetDirector network management software) (product announcement)," 1990 Apt Data Services (UK).

"Accumaster Integrator Release 3.0 expands SNA capabilities," ATT News Release dated Jun. 17, 1992.

Muller, Nathan J., "Intelligent Hubs," 1993 Artech House, Inc., pp. 73–290.

AT&T News Release dated Nov. 13, 1991.

HP Network Node Manager, http:/?www.dmo.hp.com/nsmd/ov/nnm.html, Network Node Manager, The Industry's Best Network Management Solution for Multivendor TCP/IP Environments Nov. 20, 1995, 2 pages, Hewlett Packard.

NetView/6000 and NetView for AIX, http://www.raleigh.jp-m.com/nv6/nv6over.html, Managing A World of Difference, 1995 IBM Corporation, 3 pages, Nov. 20, 1995.

Catalog: SPECTRUM 3.0, http://www.ctron.com/Catalog/Net–Management/Spectrum.html, Stectrum 3.0, Detailed Graphical Views of your Network, 4 pages, Nov. 20, 1995, Product Catalog.

ManageWise 2.0, The smart way to manage your network, Novell, Intel Network Technology From Intel, 4 pages.

METHOD AND APPARATUS FOR ORGANIZING OBJECTS OF A NETWORK MAP

CROSS-REFERENCE TO RELATED APPLICATION

This invention is related to copending and commonly assigned U.S. patent application Ser. No. 08/696,681 Attorney Docket No. 1DR37A, titled NETWORK ATLAS MAPPING TOOL, which application was filed on even date herewith.

FIELD OF THE INVENTION

This invention relates generally to network mapping tools and, more specifically, to a method and apparatus for organizing objects on a map of a network mapping tool.

BACKGROUND OF THE INVENTION

A network mapping system is typically used to manage a network system comprising a geographically distributed collection of interconnected network segments for transporting data between computing nodes, such as routers. The network segments are typically local area networks (LANs) coupled together by point-to-point wide area networks (WANs). These LAN and WAN segments may be collectively configured to form a complex topology of internetworked computing nodes that interact according to a predefined set of rules or protocols.

In general, the network mapping system provides network management service tools that may be implemented in accordance with a client/server architecture, wherein the clients, e.g., personal computers or workstations, are responsible for interacting with the users and the servers are computers configured to perform the services as directed by the clients. These service tools may range from map-drawing software to capabilities for automatically discovering the topology of network segments using a variety of LAN, WAN and protocol technologies. Information pertaining to the discovered topology is typically gathered to build a coherent database model of the internetwork system.

However, the tools used for viewing the topology of the network are typically difficult to comprehend primarily because the entire internetwork is often presented as a single, monolithic "page" on a computer display. As a result, the layout of the internetwork is such that nodes typically appear far away from their neighboring nodes, making it hard to discern relationships among elements of the system. Furthermore, the layout changes as new internetworked nodes are discovered.

SUMMARY OF THE INVENTION

The present invention relates to an improved layout technique for efficiently organizing objects displayed on a computer screen of a network mapping tool in a manner that is easy to understand and visually appealing to a user. The objects generally represent a connected graph of linked nodes within a hierarchical collection of network maps, i.e., a network atlas, wherein each map is a logical page depicting a portion of an internetwork computing system.

In accordance with the invention, the layout technique generates a compact connected graph of linked objects that is organized on a page basis, i.e., the page comprises a collection of related objects displayed on a single scrollable window. For example, objects are generally grouped near neighboring objects with whom they share links. The novel technique further configures the connected graph as a hub-and-spoke arrangement to reduce the number of overlapping objects and crossing links; such an arrangement is particularly effective for connected graphs which have few loops. Collectively, these layout features facilitate comprehension of the internetwork topology by the user of the system.

The network mapping tool includes a management server that collects and organizes topology data of the internetwork computing system as the atlas and a management console that provides a graphical user interface for displaying the atlas on the computer screen in a variety of views that facilitate comprehension of logical relationships between various components of the system. Specifically, an atlas creator of the server creates the atlas from the topology data and, thereafter, a layout manager performs novel layout operations that enable display of the created atlas maps in a manner that is visually appealing to a user. An atlas viewer of the console cooperates with the atlas manager to retrieve the atlas data describing the structure and layout of the selected maps within the network atlas.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENT

Figure 1:
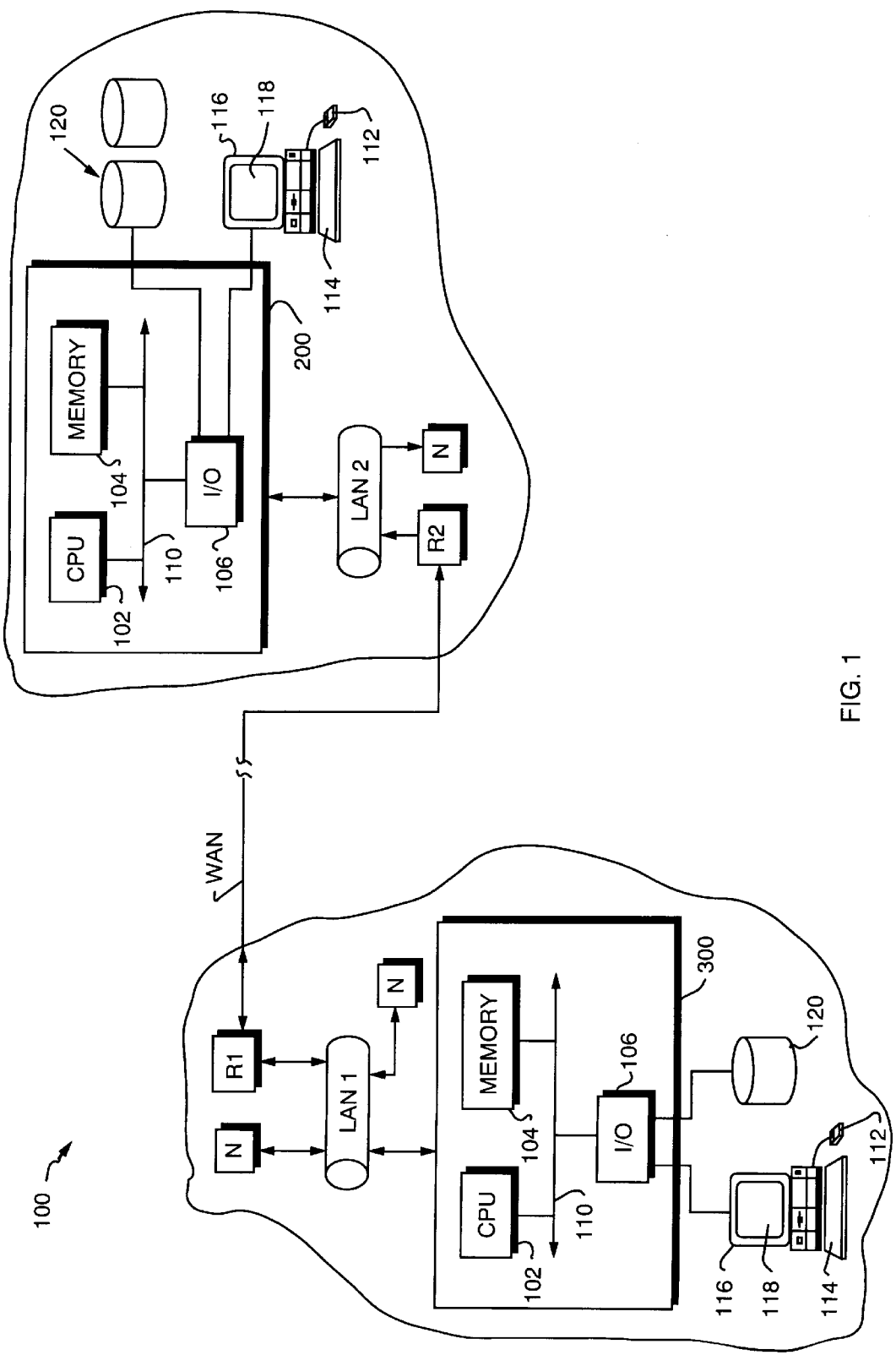
FIG. 1 is a block diagram of an internetwork computing system including a collection of network segments connected to a plurality of stations.

FIG. 1 is a block diagram of an internetwork computing system 100 comprising a collection of network segments connected to a plurality of stations. The nodes are typically general-purpose computers comprising a management server station 200, a management console station 300, a plurality of end stations N and a plurality of intermediate stations R1–R2. Each station typically comprises a central processing unit (CPU) 102, a memory unit 104 and an input/output (I/O) unit 106 interconnected by a system bus 110. The memory unit 104 may comprise storage locations typically composed of random access memory (RAM) devices, which are addressable by the CPU 102 and I/O unit 106. An operating system, portions of which are typically resident in memory and executed by CPU, functionally organizes the station by, inter alias, invoking network operations in support of application programs executing in the CPU.

The I/O unit 106, in turn, connects the station to the network segments, a conventional display monitor 116 and a mass storage device, such as disk 120. The display monitor 116 includes a display screen 118 and cursor control devices, such as a mouse 112 and keyboard 114. For the management server 200, the disk may function as a network topology database 120 for storing topology data relating to the system 100, as described further herein. Typically, the I/O unit 106 receives information, such as control and data signals, from the mouse or keyboard and provides that information to the CPU 102 for transfer over the network segments, for storage on the database or for display on the screen 118.

The network segments included within system 100 are preferably local area networks (LANs) 1–2 coupled to a wide area network (WAN) by intermediate stations R1–R2. Preferably, the intermediate stations R1–R2 are routers configured to facilitate the flow of data throughout the system 100 by routing that data to the proper receiving stations. Collectively, the LAN and WAN segments may be configured to form a complex topology of internetworked computing stations that interact according to predefined set of protocols.

A network mapping system manages such a complex internetwork computing system by providing network management services, preferably in accordance with a client/server architecture. Here, the client is the management console node 300 that is responsible for interacting with a user and the management server node 200 functions as the server to perform services as directed by the client. The mapping tool organizes and displays topology data as a hierarchical collection of network maps, i.e., a network atlas. An example of a network atlas is provided in copending and commonly assigned U.S. Patent Application titled Network Atlas Mapping Tool, filed on even date herewith, which application is incorporated by reference as though fully set forth herein. Each map of the atlas shows a portion of the computing system as a connected graph of nodes; these nodes generally comprise the router and network segments.

Figure 2:
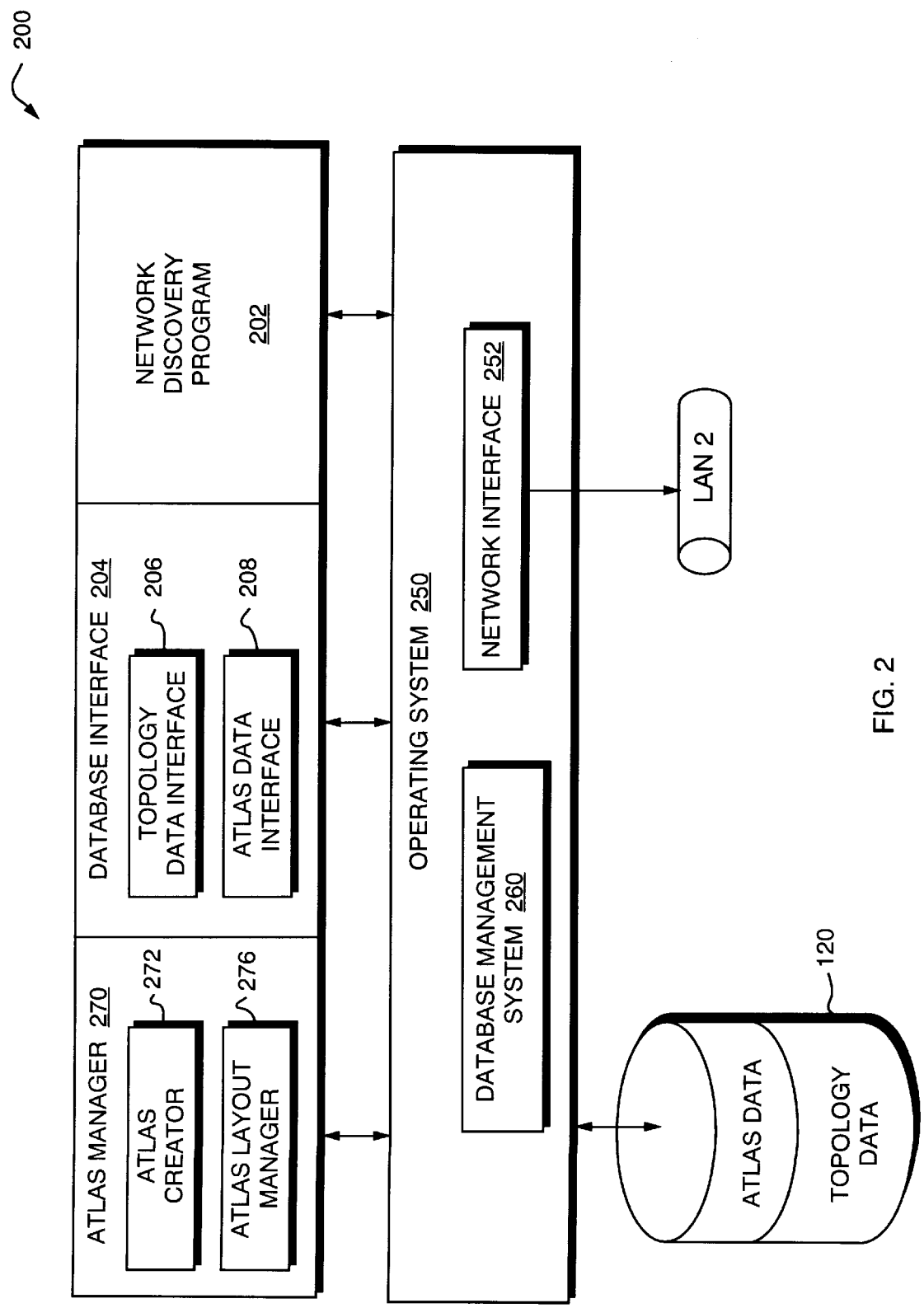
FIG. 2 is a highly schematized diagram of the software elements of a management server station coupled to the internetwork computing system of FIG. 1.

FIG. 2 is a highly schematized diagram of the software components of the management server station 200. The management server 200 monitors the internetwork in order to collect, organize and record topology data and atlas data on the topology database 120. To that end, the server includes a database interface component 204 having a topology data interface 206 and an atlas data interface 208 for accessing that data on the database. In addition, a conventional network discovery program component 202 is provided for automatically discovering the topology of network segments using a variety of LAN, WAN and protocol technologies, and further generating the data stored on the database.

The server also includes operating system software 250 having a collection of utility programs for controlling the operation of the station 200. These ultility programs generally include a network interlace 252 that provides the server access to the network system 100 and a database management system 260 that communicates with the interfaces 206 and 208 when exchanging data with the database 120.

The management server 200 further comprises an atlas manager 270 that coordinates access to the database 120 for editing and viewing the atlas maps. The atlas manager, in turn, comprises an atlas creator 272 that creates the atlas from the topology data and, in accordance with an aspect of the invention, a layout manager 276. As described herein, the layout manager 276 performs novel layout operations that enable display of the created atlas maps in a manner that is visually appealing to a user.

Figure 3:
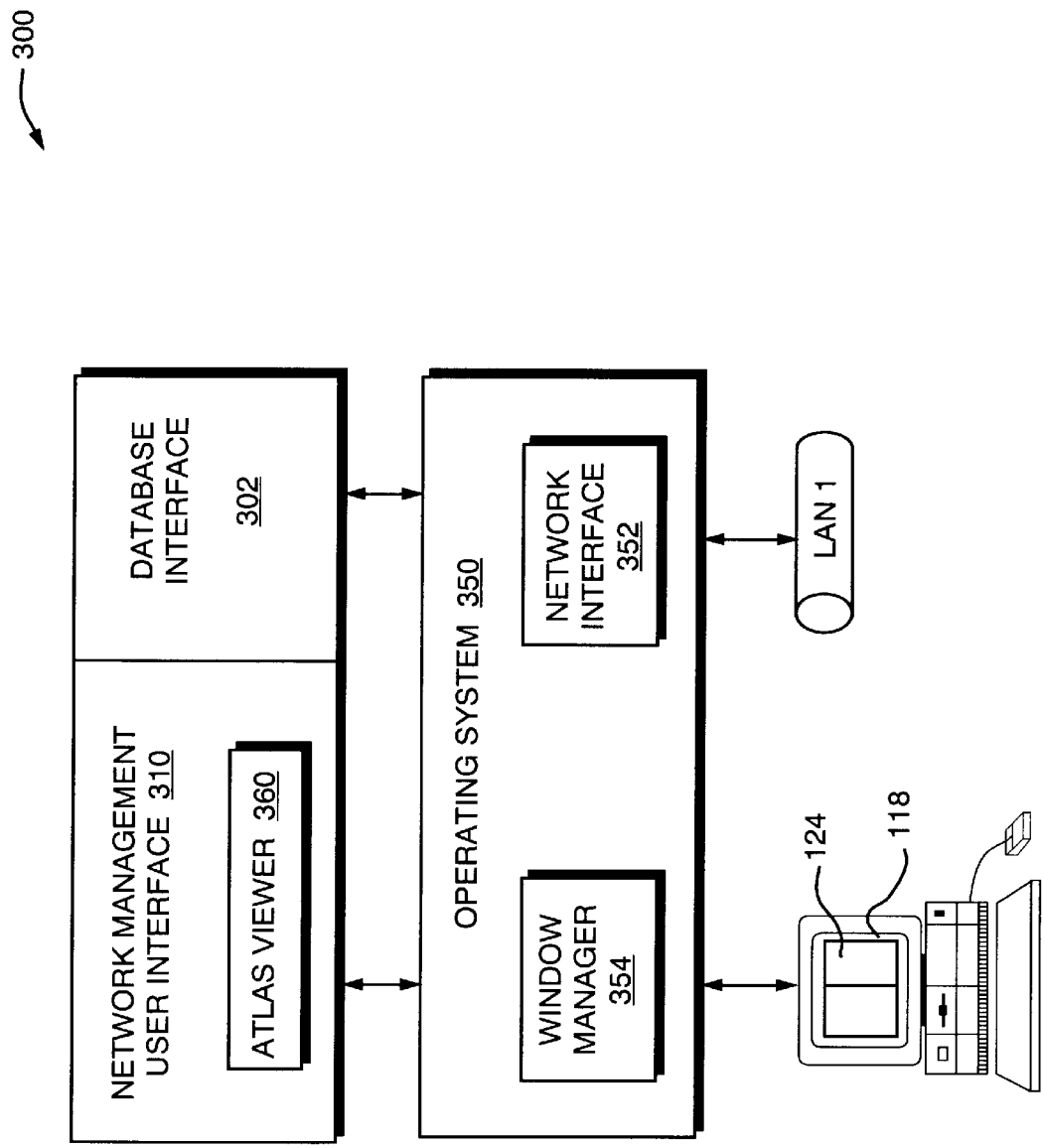
FIG. 3 is a highly schematized diagram of the software elements of a management console station coupled to the internetwork computing system of FIG. 1.

FIG. 3 is a highly schematized diagram of the software components of the management console station 300. These components generally include an operating system 350 which interacts with various application program components to provide high-level functionality, including a direct interface with the user. The application program components include a database interface component 302 configured to interact with the management server 200 when manipulating data and controlling the operations of that server. In addition, a network management user interface component 310 allows the user to view aspects of the internetwork system (e.g., configuration, state and history) and perform management-type operations on the internetwork.

The operating system software includes ultility programs such as a network interface 352 that provides the console with access to the network system 100 and a window manager 354. The window manager is a system software routine that is generally responsible for managing windows that the user views during operation of an application program component. That is, it is generally the task of the window manager to keep track of the locations and sizes of the windows and window areas which must be drawn and redrawn in connection with such application execution.

Broadly stated, the application programs make use of the functions of the utility programs by issuing a series of task commands to the operating system which then performs the requested task. For example, the database interface component 302 may request that the network interface 352 initiate transfer of information over LAN 1 or the network management user interface 310 may request that the window manger 354 display certain information on a window of the screen 118 for presentation to the user.

Further to this latter example, the console 300 also comprises an atlas viewer application component 360 which, in connection with the window manager 354, provides a graphical user interface for displaying the topology data as an atlas on specialized windows 124 of the display screen 118. Specifically, the atlas viewer and window manger operate to display views of selected maps of the atlas on viewer windows 124 to facilitate comprehension of logical relationships between various components of the system 100. The atlas viewer 360 further cooperates with the atlas manager 270 to retrieve the topology data describing the structure and layout of the selected maps within the network atlas. As the user "browses" the atlas, the viewer module fetches the appropriate data from the network topology database needed to execute the navigation and display functions.

Each station of the system 100 may be a general-purpose computer, such as a personal computer of the IBM® series of computers sold by International Business Machines Corp., although the invention may also be practiced in the context of other types of computers. These computers have resident thereon, and are controlled and coordinated by, operating system software, such as the IBM OS/2® operating system or the Microsoft® Windows® operating system. In addition, a window environment, such as the Windows® graphical user interface, is preferably displayed on the screen 118 as a graphical display to facilitate interactions between the user and the station. The graphical display is typically arranged to resemble a desktop and, as described herein, the application programs execute in the viewer windows 124 of the screen 118.

The invention herein features, along with these specialized windows, the provision of the network mapping tool which, when invoked, cause actions to take place that enhance the ability of a user to interact with the computing system. The mapping tool efficiently organizes and displays the topology data of the system as atlas elements in a manner that is easy to understand and visually appealing to the user. This new behavior is brought about by the interaction of the mapping tool with a series of system software routines associated with the operating system. These system routines, in turn, interact with the application program components to create the viewer windows, and atlas elements, as described herein.

Figure 4:
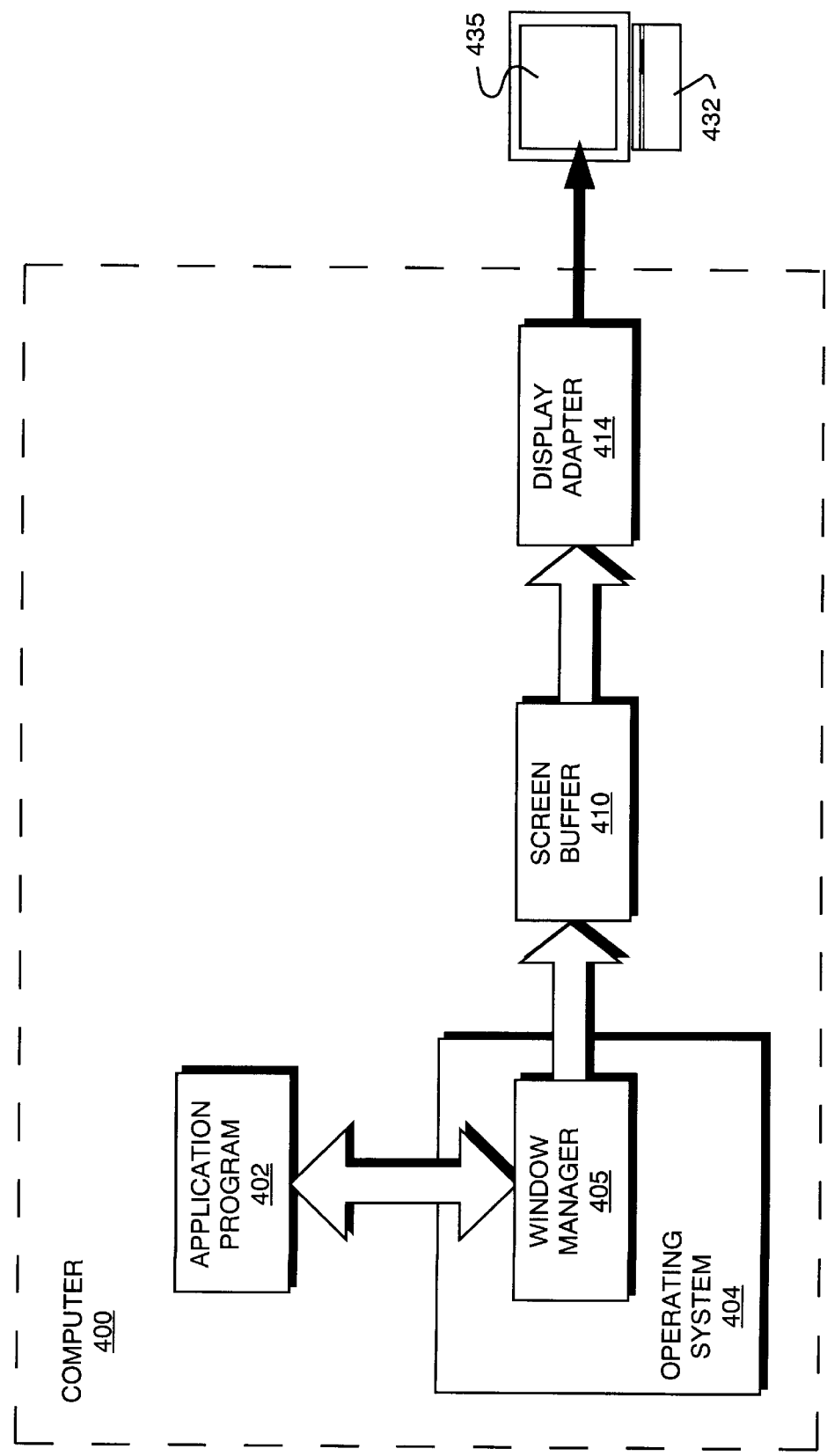
FIG. 4 is a schematic diagram illustrating the interaction of an application program and an operating system of a computer, which is similar to the management console station of FIG. 1.

FIG. 4 is a schematic illustration of the interaction of an application program 402 and an operating system 404 of a computer 400, which is similar to, and has equivalent elements of, the console station 300. The application program 402 and the operating system 404 interact to control and coordinate the operations of the computer 400. In order to display information on a screen display 435, application program 402 generates and sends display commands to a window manager 405 of the operating system 404. The window manager program 405 stores information directly into a screen buffer 410.

Under control of various hardware and software in the system, the contents of the screen buffer 410 are read out of the buffer and provided to a display adapter 414. The display adapter contains hardware and software (sometimes in the form of firmware) which converts the information in the screen buffer 410 to a form which can be used to drive a display screen 435 of a monitor 432.

In a preferred embodiment, the invention described herein is implemented in a C++ programming language, such as Microsoft Visual C++, using object-oriented programming (OOP) techniques. The C++ language is well-known and many articles and texts are available which describe the language in detail. In addition, C compilers are commercially available from several vendors. Accordingly, for reasons of clarity, the details of the C++ language and the operation of its compiler will not be filthier discussed.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item.

Objects are defined by creating "classes" which are not objects themselves, but which act as templates that instruct the compiler how to construct an actual object. A class may, for example, specify the number and type of data variables and the steps involved in the functions which manipulate the data. Objects are created and destroyed at run-time according to functions defined by the classes; the functions are compiled into executable statements by the compiler. Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. Polymorphism is a concept which allows objects and functions that have the same overall format, but that work with different data, to function differently in order to produce consistent results. Inheritance, on the other hand, allows program developers to easily reuse pre-existing programs and to avoid creating software from scratch.

Figure 5:
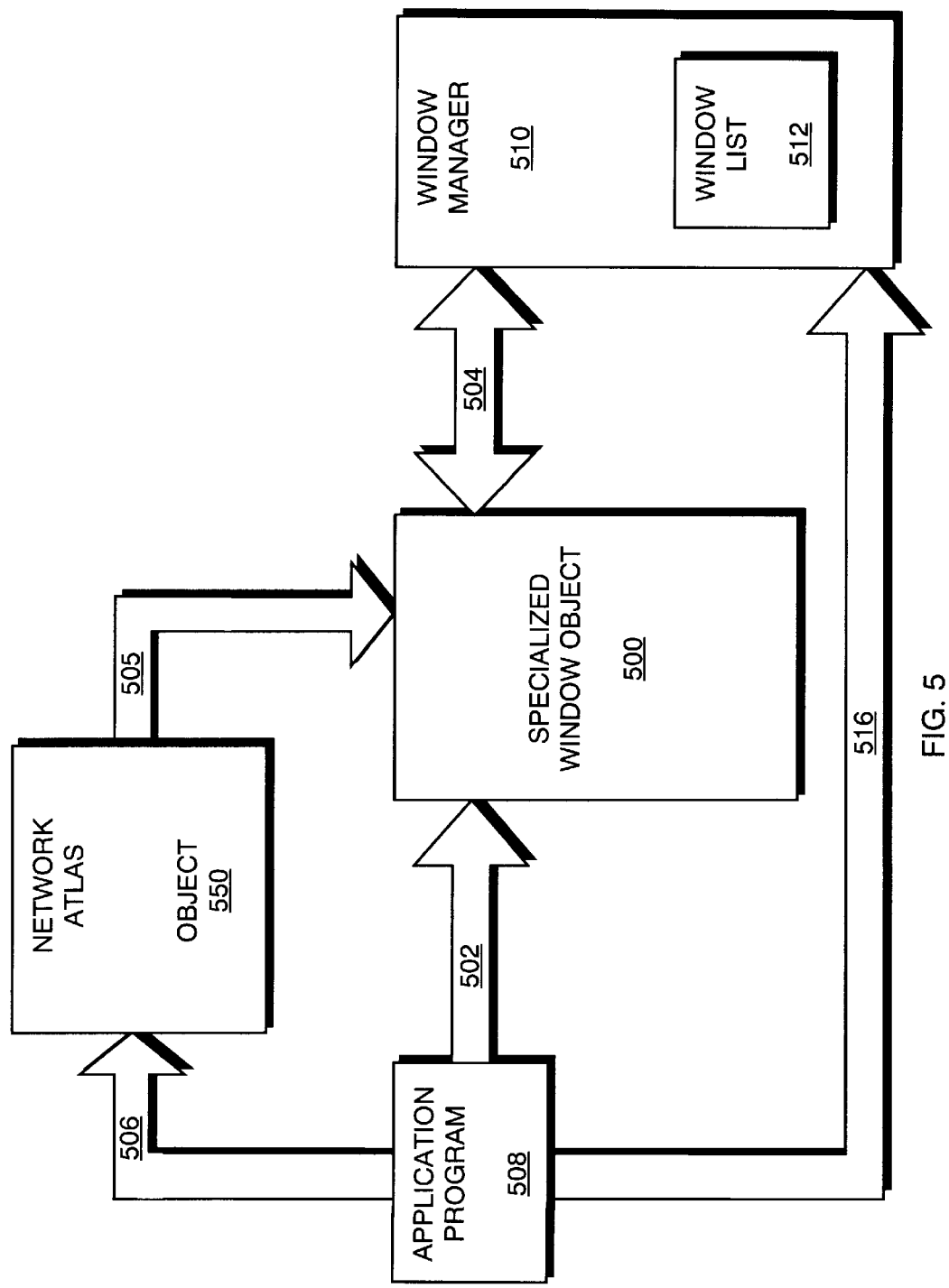
FIG. 5 shows the interaction between an application program and a window manager to create and manipulate network atlas objects in accordance with the invention.

In the illustrative embodiment, the windows and atlas elements are "objects" created by the application program to communicate with the window manager. Interaction between an application program and a window manager is illustrated in greater detail in FIG. 5. In general, an application program 508 interfaces with the window manager 510 by creating and manipulating objects. The window manager itself may be an object which is created when the operating system is started. Specifically, the application program creates specialized window objects 500, as depicted by arrow 502, that cause the window manager to create associated viewer windows on the display screen. In addition, the application program 508 creates individual network atlas objects 550, indicated by arrow 506, that are stored in each window object 500 via arrow 505.

Since many atlas objects may be created in order to display many atlas maps on the display screen, the window object 500 communicates with the window manager 510 by means of a sequence of drawing commands issued from the window object 500 to the window manager 510, as illustrated by arrow 504. The application 508 also communicates with the window manager 510 by sending commands to the manager 510, as indicated by arrow 516. The window manager 510 maintains a window list 512 that contains each window currently in the system.

Although OOP offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

There are many kinds of application frameworks available, depending on the level of the system involved the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), Smalltalk-80 MVC (ParcPlace), Java (Sun Microsystems) and, as described further herein, Microsoft Foundation Classes (MFC).

A preferred embodiment takes the concept of frameworks and applies it throughout the entire system, including the application and the operating system. For the commercial or corporate developer, systems integrator, or OEM, this means all of the advantages that have been illustrated for a framework, such as MFC, can be leveraged not only at the system level for such services as printing, graphics, multimedia, file systems and I/O operations, but also at the application level, for things such as text, graphical user interfaces and, as described herein, network mapping tools.

Referring again to FIG. 5, the window objects 500 are elements of an improved network mapping tool having a customizable framework for greatly enhancing the ability of a user to interact with an application executing on the internetwork computing system. As described herein, the application executes in specialized viewer windows represented by the window objects. In addition, the customizable framework facilitates creation of different objects, such as the network atlas objects 550, stored in the memory 104. These objects generally represent a connected graph of linked nodes within the hierarchical atlas of maps displayed on screen 118 of monitor 116.

Figure 6:
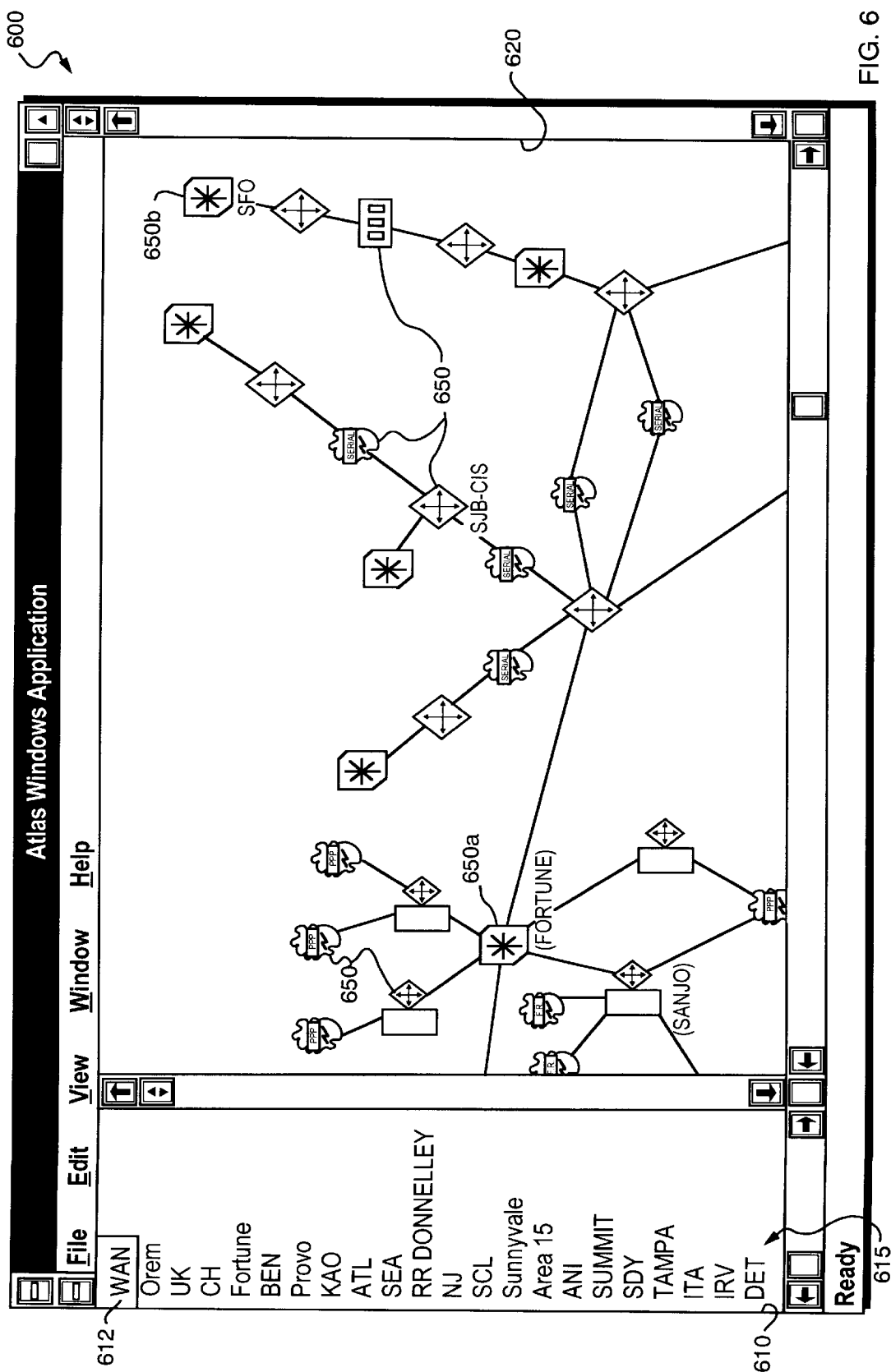
FIG. 6 is a diagram of a specialized viewer window that is used to display the network objects of the invention.

FIG. 6 is a diagram of a specialized viewer window 600, which is similar to the window 124 appearing on display screen 118. The viewer window 600 is configured to simplify moving among locations of the atlas maps and, as such, provides navigation features within a plurality of panes 610 and 620. In the left pane 610, a browser 615 is provided to display a list of map names, as the right pane 620 displays a map that is selected from among those names of the browser list. Specifically, the browser navigation facility allows a user to easily switch between maps of interest by selecting the name of a desired map. The desired map may be displayed by positioning the mouse pointer and clicking on that name. The currently displayed map page is indicated by a box 612 surrounding the corresponding map name. It should be understood that other types of browsers, e.g., a tree browser depicting a directory of maps, may be used in place of the browser list. In this case, the tree browser would allow the user to go directly to a specific map from the map directory.

As noted, the atlas manager 270 (FIG. 2) of the mapping tool automatically constructs a set of hierarchical, internetwork maps from the topology data stored on network topology database 120. Like a traditional atlas, each map depicts a portion or page of the internetwork system on the pane 620. A top-level page illustrates the overall WAN structure of the system by setting forth the interconnectivity between campuses, i.e., LAN-connected areas of the system. Individual LAN maps, each depicting the organizational structure of a campus, are presented on subordinate-level pages.

The nodes of the graphs are preferably router and segment objects that "interface" via connected graph links. Each map may refer to other maps of the atlas by way of map cross-reference objects, although a map may not cross-reference itself. The router, segment and cross-reference objects are displayed as icons 650 at various locations on a map; for example, the map name Fortune listed on the browser 615 is depicted as an icon 650a on the WAN map of pane 620. The atlas manager 270 and atlas viewer 360 manage the links by automatically drawing lines coupling icons on the map. Also, when an icon on one map is connected to at least one icon on a cross-referenced map, a link is drawn between those icons.

Figure 7:
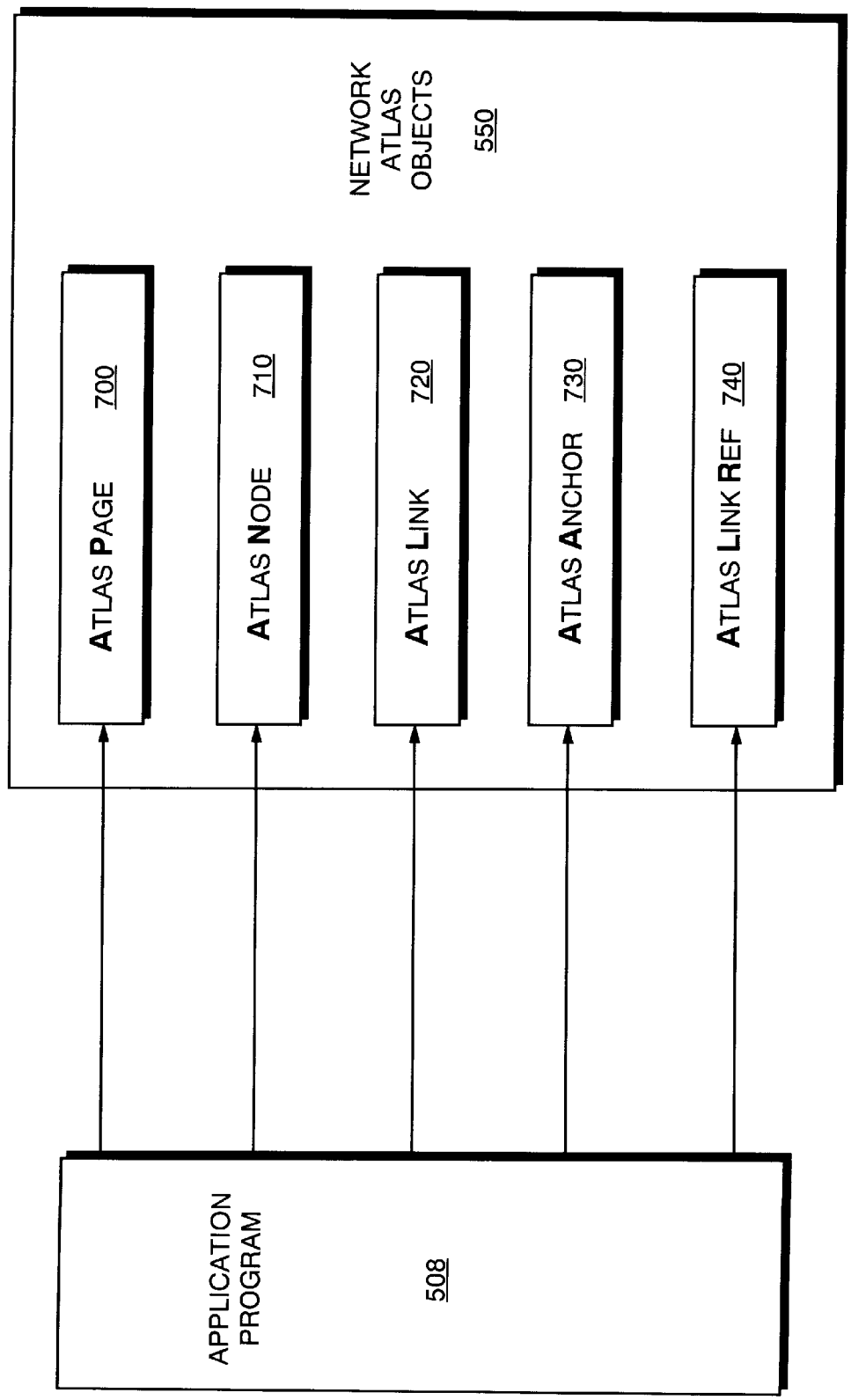
FIG. 7 is a schematic diagram of the network atlas objects used by the application program in accordance with the invention.

FIG. 7 is a schematic diagram of the network atlas objects 550 used by is the application program 508 to represent key elements of the topology data of the atlas. In accordance with the invention, these objects include an AtlasPage object 700, an AtlasNode object 710 and an AtlasLink object 720. The AtlasPage object 700 represents a single map in the atlas, e.g., the map displayed on the right pane 620 of viewer window 600. The AtlasNode object 710 corresponds to a node in a connected-graph, i.e., an object that is connected to other objects. As described further herein, the AtlasPage object 700 is preferably derived from the AtlasNode object 710 to enable, in the case of a cross-referenced map, that map to appear as a cross-referenced node on another map. The AtlasLink object 720 corresponds to a connected graph link that forms an association between two nodes.

Moreover, two additional objects are provided to define those nodes and links that are represented on various maps. An AtlasAnchor object 730 associates an AtlasNode object 710 with the AtlasPage object 700 upon which the AtlasNode is displayed. An attribute of this anchor association defines the position on the page where the node appears. An AtlasLinkRef object 740 associates at least one AtlasLink object 720 with an AtlasPage object 700; this indicates that those constructed link(s) appear(s) on the constructed page.

In order to further understand the operations of these window and network atlas objects, it may be useful to examine their construction together with the major function routines that comprise the behavior of the objects. In examining the objects, it is also useful to examine the classes that are used to construct the objects (as previously mentioned the classes serve as templates for the construction of objects). Thus, the relation of the classes and the functions inherent in each class can be used to predict the behavior of an object once it is constructed.

Figure 8:
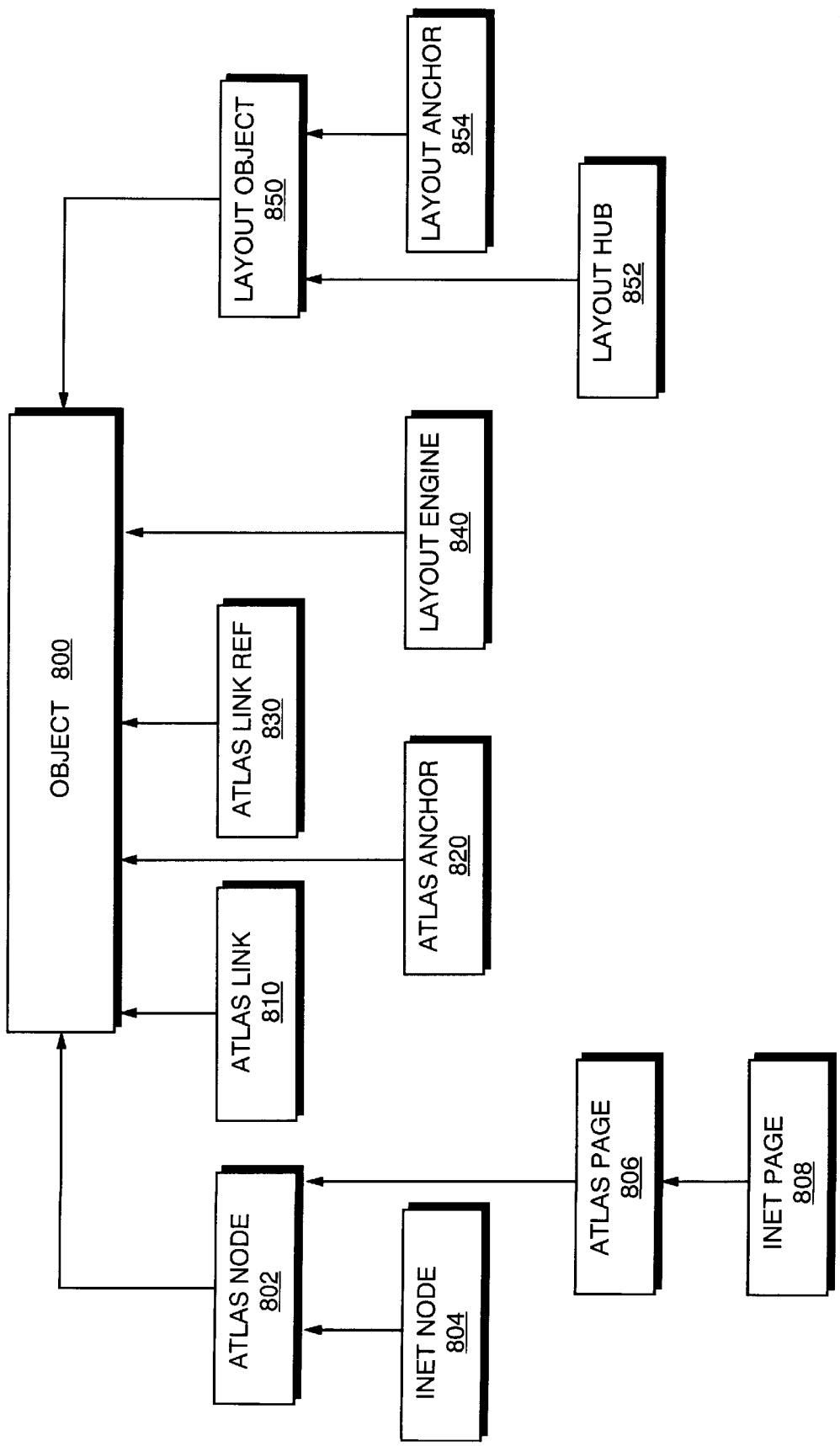
FIG. 8 is a simplified class hierarchy diagram for the network atlas objects of FIG. 7.

The invention as described herein supports Windows® API messaging and, in particular, those messaging functions supported by various conventional generic base object classes of the MFC C++ class library. FIG. 8 shows a simplified class hierarchy diagram of one of these generic base classes, the Object class 800, used to define novel atlas objects of the invention. In fact, of the classes used to construct the atlas objects are subclasses of Object and thus inherit any functional operators that are available from that base class. Indeed, the class Object 800 is a generic base class for all the MFC object classes shown in FIG. 8 and provides all message-handling functions that these objects classes need.

For example, the class AtlasNode 802 is a subclass of the base class Object and is used to construct a node in a connected graph. The classes InetNode 804 and AtlasPage 806 are, in turn, derived from AtlasNode 802; InetNode 804 is used to encapsulate a router or segment node in the internetwork connected graph, while AtlasPage 806 is used construct a page (map) in the atlas. This latter class is subclassed from a node because a map may appear on another map as an abstraction of a portion of the connected graph. The class InetPage 808 defines an internetwork specific page object.

The classes AtlasLink 810, AtlasAnchor 820, AtlasLinkRef 830 and LayoutEngine 840 are subclasses of Object 800. Specifically, AtlasLink 810 is used to construct a connected graph link object between two node objects defined by AtlasNode 802, and AtlasAnchor 820 is used to construct an object that denotes the presence and position of a node on a particular page (map) in the atlas. AtlasLinkRef 830 creates an object denoting the appearance of a particular link on a particular page of the atlas; such an object is generated when the atlas is created or edited for computation and communication efficiency for rendering a page in real-time. The class LayoutEngine 840 is used to construct a controller object for layout operations.

LayoutObject class 850 is another subclass of base class Object 800 and it is primarily used to create an object that abstracts at least one other object; in other words, LayoutObject creates a transient object used temporarily during a layout process. The classes Layouthub 852 and LayoutAnchor 854 are further derived from LayoutObject 850. LayoutHub 852 is an abstraction of a collection of layout objects that form a hub (parent) and spoke (child) organization, as described further herein, while LayoutAnchor 854 is used to construct a layout object that refers to a connected graph node's anchor.

Figure 9:
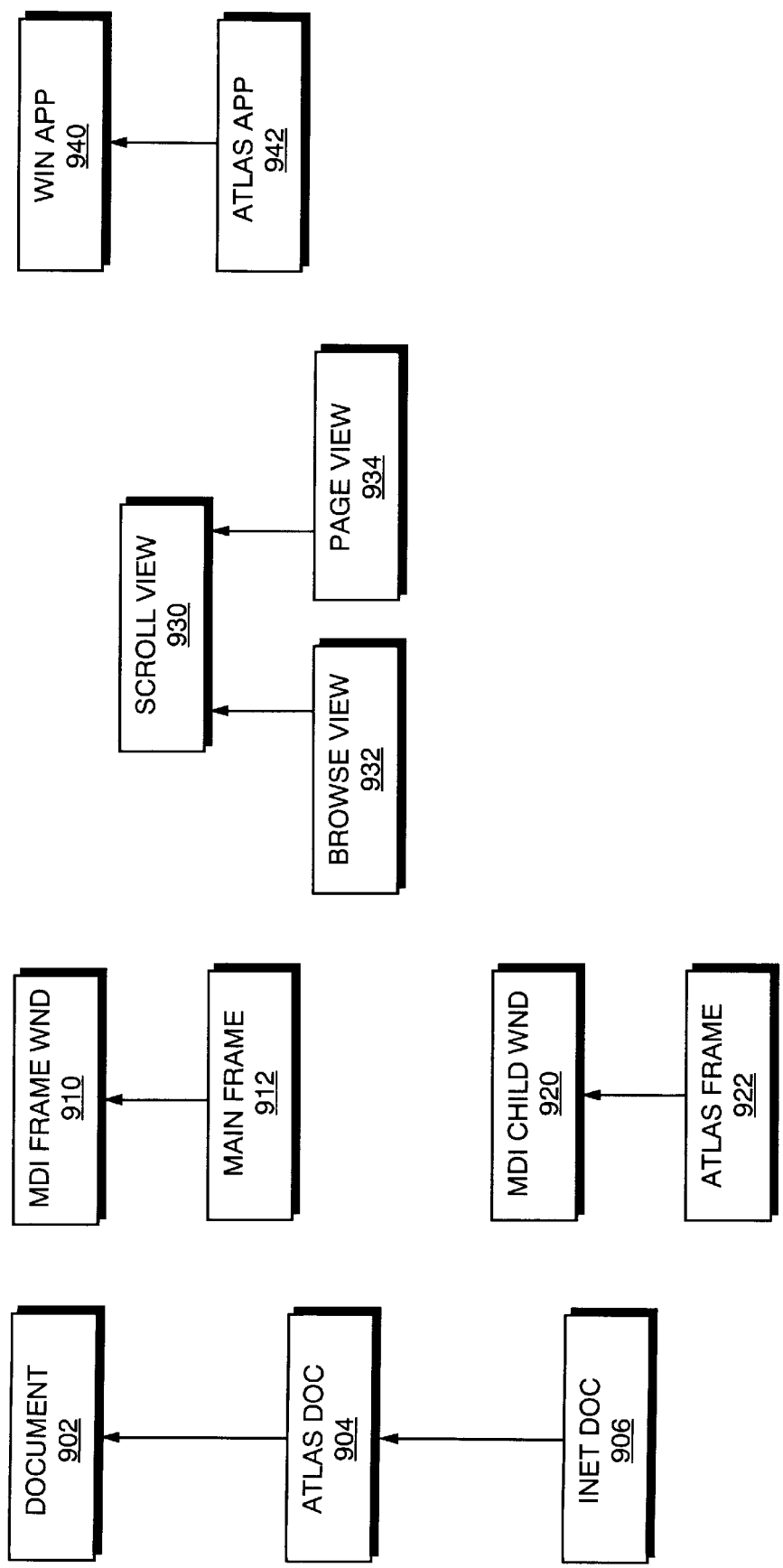
FIG. 9 shows simplified class hierarchy diagrams for various application, document and window objects of the invention.

FIG. 9 depicts simplified class hierarchy diagrams for various application, document and window objects of the invention. For example, the class AtlasDoc 904, used to construct an Atlas document object, is a subclass of the MFC document management class Document 902, while the class InetDoc 906, which is a subclass of AtlasDoc 904, is used to construct an Atlas document object that is specific to inter-networking applications. The class MainFrame 912 is a subclass of the MFC frame window class MDIFrameWnd 910; this former class is used to create a main Atlas viewer window object. Similarly, the class AtlasFrame 922, used to construct pane objects for the Atlas viewer windows, is a subclass of the MFC MDI child window class MDIChildWnd 920.

ScrollView 930 is a MFC scrollable viewer window class from which two subclasses are derived: BrowseView 932, used to encapsulate a browser window pane object, and PageView 934, used to create page (map) window pane objects. Lastly, the class AtlasApp 942 is a subclass of the MFC application class WinApp 940 that is used to create an Altas application object.

Figure 10:
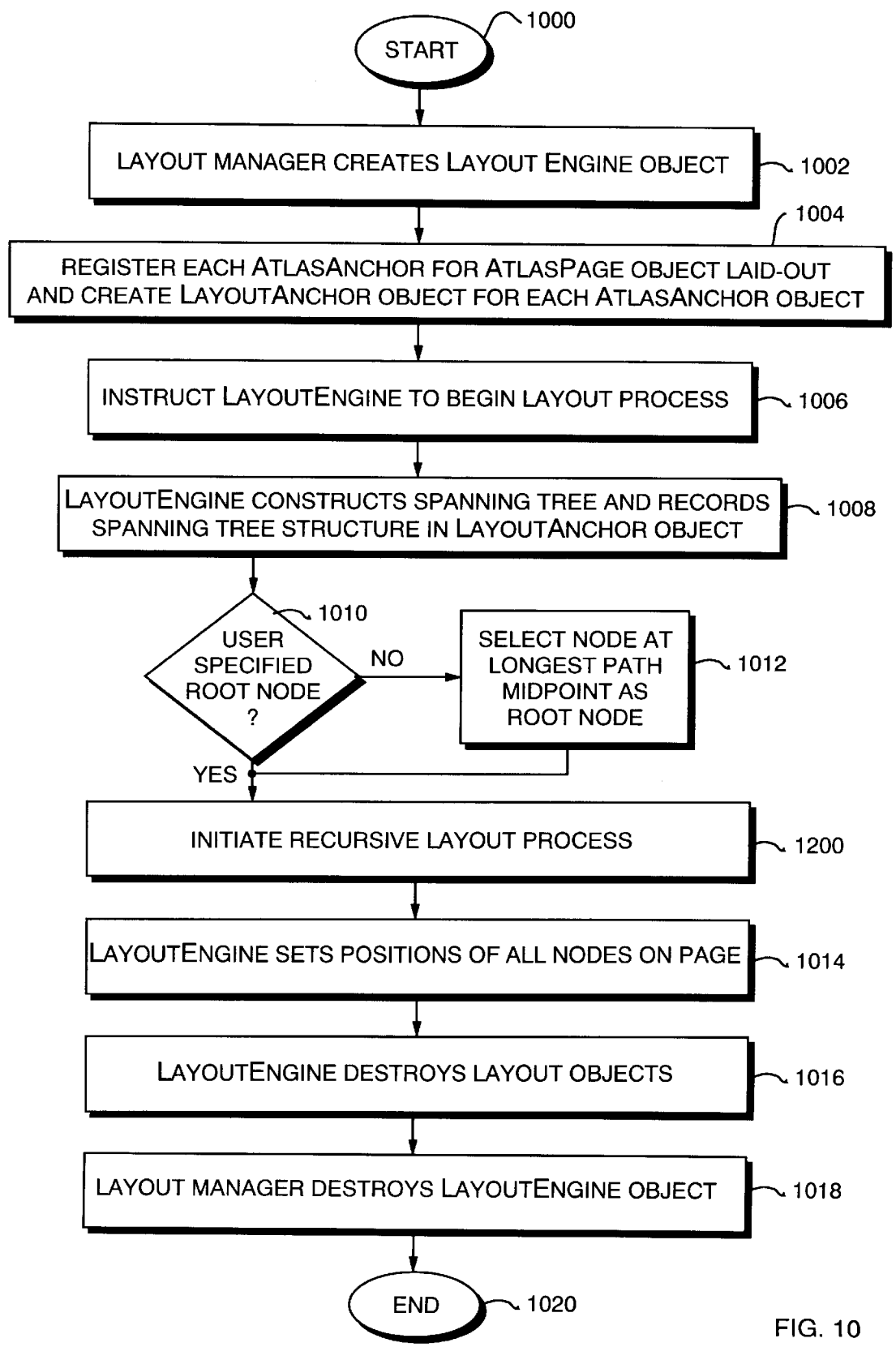
FIG. 10 is a flowchart illustrating an improved layout process for efficiently organizing objects displayed on a display screen of a network mapping tool in accordance with the present invention.

As noted, the present invention relates to an improved layout technique for efficiently organizing the atlas objects displayed on a viewer window 600 of the network mapping tool in a manner that is easy to understand and visually appealing to a user. FIG. 10 is flowchart illustrating the sequence of steps comprising the improved layout procedure. Prior to initiating the improved procedure, an atlas creation process is performed whereby the atlas creator 272 creates all AtlasAnchor objects 730 and AtlasPage objects needed during the procedure. An example of the atlas creation process is described in the previously incorporated application titled Network Atlas Mapping Tool.

In general, the layout manager 276 executes novel layout operations that generate a compact connected graph of linked objects that is organized on a page basis, i.e., the page comprises a collection of related objects displayed on a single scrollable window. Specifically, objects are grouped near neighboring objects with whom they share links. The novel technique further configures the connected graph as a hub-and-spoke arrangement to reduce the number of overlapping objects and crossing links; such an arrangement is particularly effective for connected graphs which have few loops. Collectively, these layout features facilitate comprehension of the internetwork topology by the user of the system.

The layout procedure starts in Step 1000 and proceeds to Step 1002 where the atlas layout manager creates a LayoutEngine object. In Step 1004, the layout manager informs the newly-created LayoutEngine about the existence of AtlasAnchor objects for the page being laid-cut by registering each AtlasAnchor object using an anchor registration member function of the LayoutEngine. The LayoutEngine also creates a LayoutAnchor object for each AtlasAnchor object. The layout manager then initiates the layout process by executing a layout member function of the LayoutEngine in Step 1006.

In Step 1008, the LayoutEngine object constructs a spanning tree for each independent connected graph of linked atlas objects and records the spanning tree structure in the LayoutAnchor objects. A spanning tree is a subset of the connected graph in which exactly one path exists between any pair of nodes. Spanning trees, and spanning tree algorithms used to calculate these trees, are well-known and therefore, will not be further discussed herein.

Figure 11:
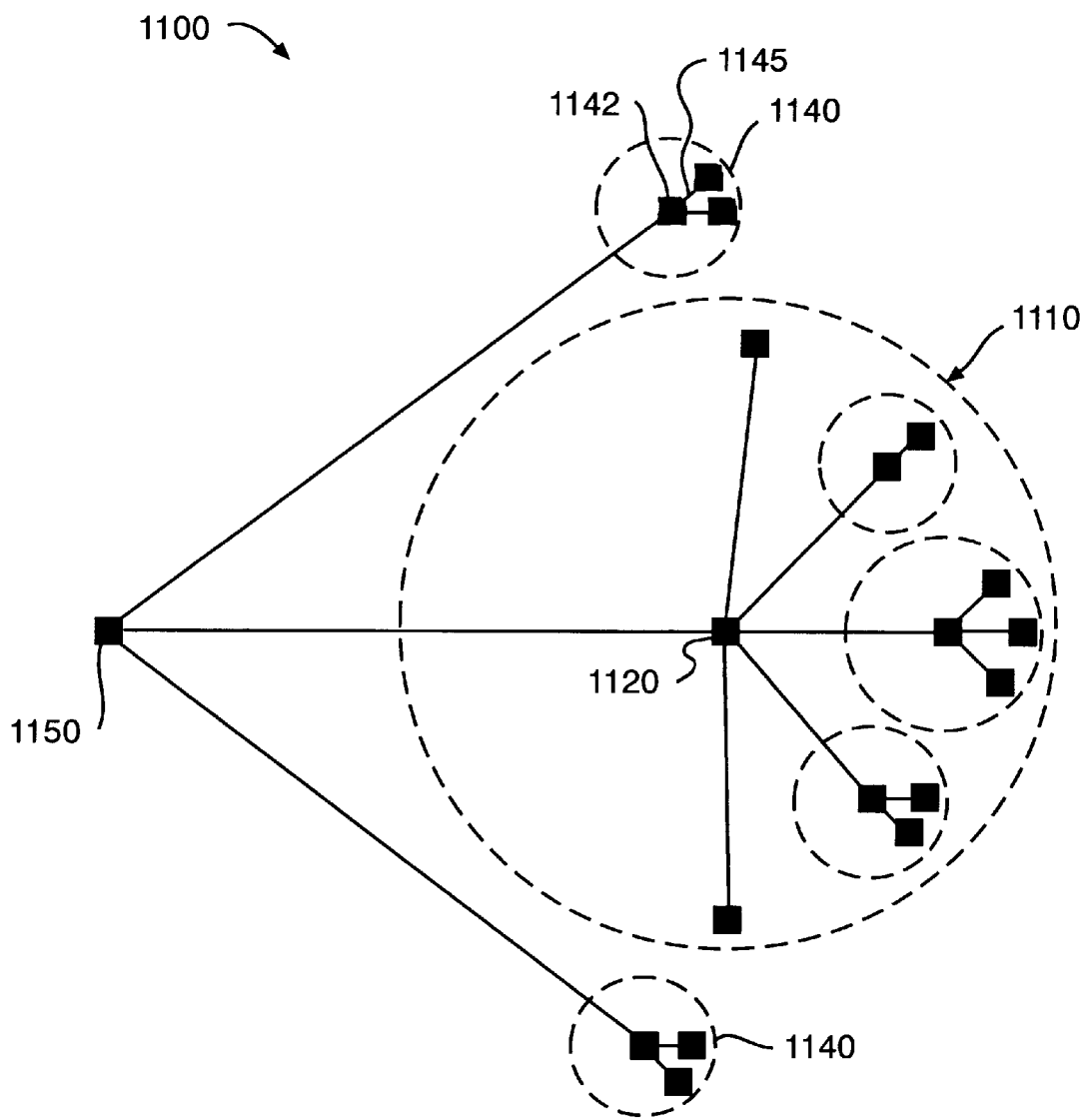
FIG. 11 is a schematic diagram of an examplary layout of a spanning tree indicating hub-and-spoke star groupings in accordance with the invention.

In Step 1010, an inquiry is made as to whether the user specified a root node for each constructed spanning tree. If not, the LayoutEngine selects a node at the midpoint of the longest path through the spanning tree as the root node (Step 1012). A plurality of hub-and-spoke groups, i.e., stars, are then created in Step 1200 using LayoutHub objects by recursively laying-out each branch of the spanning tree, starting at the root node. FIG. 11 illustrates an examplary layout of a spanning tree 1100 wherein dashed circles indicate the hub-and-spoke star groupings 1110. Selection of a root node has a significant impact on the resulting layout, i.e., a better layout generally results from selecting a node near the center of the spanning tree rather than at an extremity of the tree. In the illustrative embodiment of the invention, the root node 1150 is preferably located at the mid-point of the longest path through the spanning tree; however, it should be noted that the user can select any node to be the root.

Figure 12:
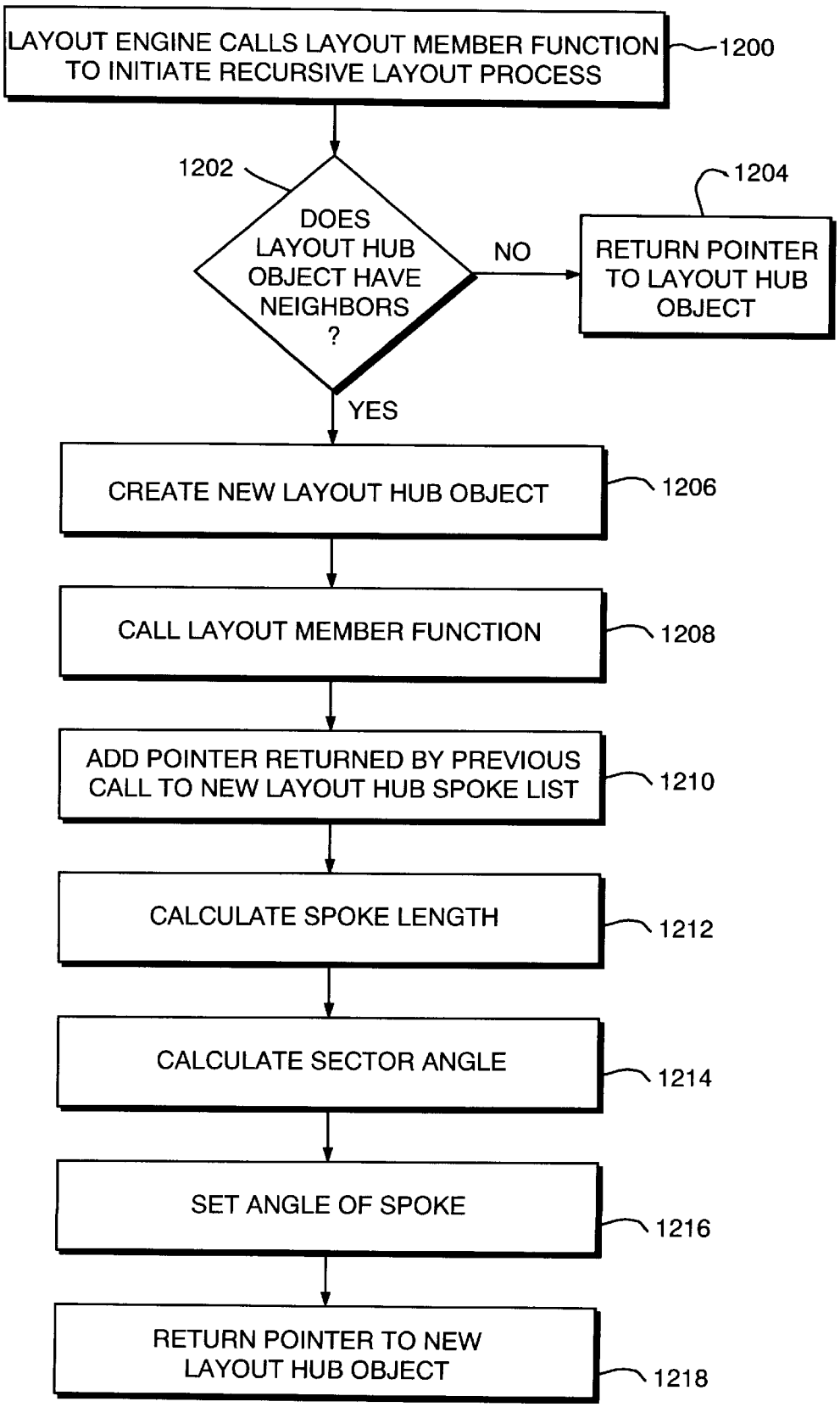
FIG. 12 is a flowchart illustrating a recursive layout process of the improved layout process of FIG. 10.

FIG. 12 is a flowchart illustrating the sequence of steps comprising the recursive layout process for each branch of the spanning tree. In general, the hub-and-spoke groupings comprises leaf (i.e., neighbor) nodes grouped with their parent node. As shown in FIG. 11, such grouping generates a new larger node that replaces a parent node and its leaf nodes in the spanning tree with a newly-created leaf node 1140 of the spanning tree. These newly generated groups are laid-out internally with the parent node 1142 at the center and the leaf nodes arranged as spokes 1145 along a circular arc surrounding the parent.

The LayoutEngine initiates the process in Step 1200 by calling the root object's layout member function. In Step 1202 the layout member function begins by determining whether the initial LayoutHub object has neighbors. If not, a pointer is returned to the initial object in Step 1204; otherwise, a new LayoutHub object is created in Step 1206 with the initial object designated as a parent object.

In Step 1208, the LayoutEngine calls a layout member function for each newly-created leaf object and the returned pointer (Step 1204) is added to a spoke list of the newly-created leaf object in Step 1210. After each neighbor object is created, the spoke length (i.e., the distance from the parent object to the leaf object) is calculated in Step 1212 by taking the maximum of (i) the sum of the leaf radii divided by $\pi$ and (ii) the sum of the largest leaf's radius and its parent's radius. All spokes within each grouping have generally the same lengths; this ensures that there is sufficient room to place all leaves in a circle around the parent with no overlap of adjacent leaves or overlap of the parent and a leaf.

In Step 1214, a sector angle is calculated for each spoke and leaf object by dividing the diameter of the leaf by the spoke length. The angle of the spoke is set in Step 1216 according to the position of the neighbor spoke and the sector angle. This operation organizes the spokes and leaves in a circular fashion around the parent to ensure that adjacent leaves do not overlap. In Step 1218, a new pointer is returned to the new LayoutHub object.

Returning to the flowchart of FIG. 10, the LayoutEngine sets the positions of all nodes on a map page for each spanning tree in Step 1014. At this point, the graph is logically laid-out; however, the actual positions of the nodes on the page have not been determined. A "depth-first" pass through the hub and spoke hierarchy is done to set the positions of each AtlasNode object on the page (map). These positions are recorded in the AtlasAnchor objects that anchor each node to the AtlasPage object (map). The depth-first pass starts at the most central LayoutHub object in the hierarchy by setting its center at a position offset from the top and left sides of the page by the length of its radius (i.e., the radius including all levels of the hub and spoke hierarchy).

The pass proceeds in a recusive depth-first fashion along each spoke. As each new hub object is encountered it is rotated such that its spokes radiate outward from the root node of the hub and spoke hierarchy. When a leaf node is encountered (i.e., a LayoutAnchor object), the Cartesian coordinates of its center are recorded in the associated AtlasAnchor object. Similarly, the coordinates of the center of each LayoutHub object are recorded in the AtlasAnchor object associated with the AtlasNode object located at the center of each hub.

In Step 1016, the LayoutEngine destroys the layout objects and in Step 1018, the layout manager destroys the LayoutEngine object. The sequence then ends in Step 1020.

While there has been shown and described an illustrative embodiment for generating a compact connected graph of linked objects in accordance with a novel layout technique, it is to be understood that various other adaptations and modifications may be made within the spirit and scope of the invention. For example, additional improvements may be employed to enhance the layout technique. A first such improvement involves placing spoke objects along the exterior side of the hub, i.e., root node, as shown in FIG. 11. Note that the "exterior" is generally to the right of the hub node 1120 while the "interior" is generally to the left; accordingly, the spokes are generally to the right of the hub node. If necessary, the hub nodes are rotated during the second pass of the layout process so that the spokes remain on the exterior side of the star that results from this process. A second improvement involves arranging the spokes so that the largest objects are close to the center of the exterior side of the hub. Again, as shown in FIG. 11 at 1110, the largest objects are generally oriented to the right of the hub.

A third improvement to the novel layout technique recovers unused space on the interior side of the hub objects. FIG. 11 depicts an unnecessarily large amount of white space on the interior side; it is thus apparent that each hub object (e.g., node at 1120) can be repositioned towards its respective parent node (e.g., node at 1150) without causing overlapping among nodes or crossing among links. This improvement represents a small, but significant optimization since wasted space on the map accumulates and grows geometrically with the depth of the spanning tree.

Figure 13:
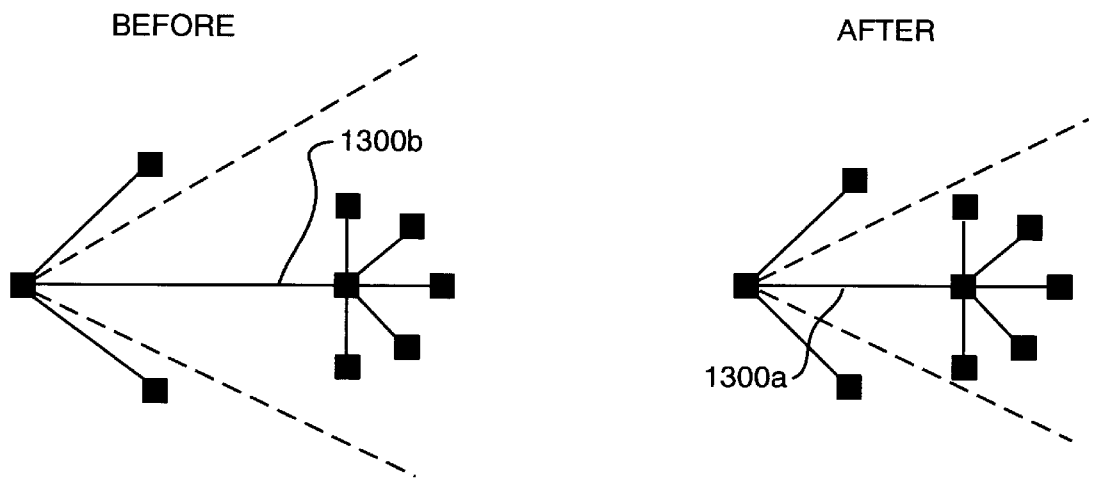
FIG. 13 is a schematic diagram illustrating a first embodiment of an improvement of the novel layout process relating to approximate minimum spoke lengths according to the invention.

Specifically, much of the unnecessary white space can be recovered using simple geometry and a few approximations to determine the minimal spoke radius (i.e., the distance from the center of the parent node to the center of the child "spoke" object). As shown in FIG. 13, the length of each spoke may be shortened to the point at which objects associated with the spoke contact radial lines forming a sector allocated to that spoke. Shortening the spoke any further could result in overlap of nodes from adjacent spokes. The approximate minimum spoke length for each spoke 1300*a,b* in FIG. 13 is determined in accordance with Equation 1 as follows:

$$Rs_{\min} = \left(\frac{r_n + y_n}{\tan \alpha} - x_n\right) * 1.15$$

Figure 14:
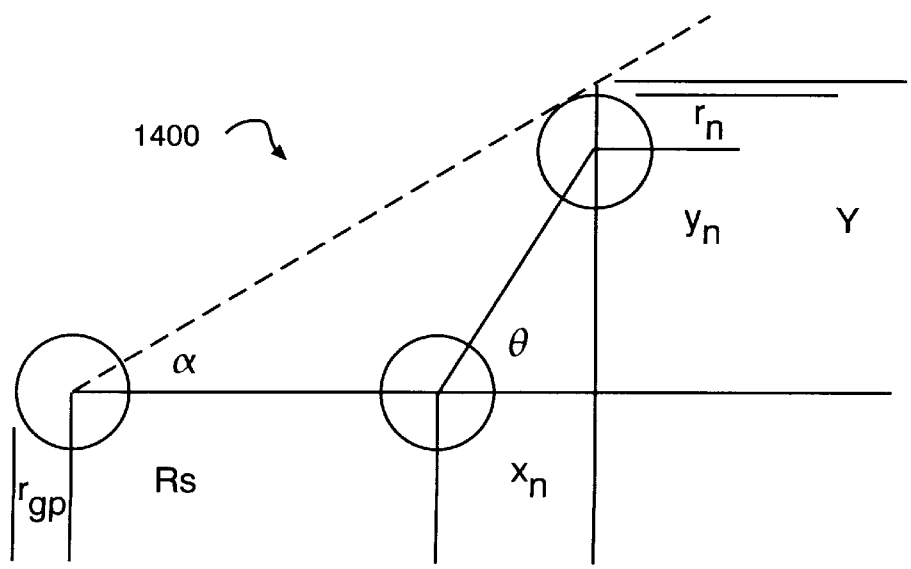
FIG. 14 is a schematic diagram depicting the terms of a first equation used to determine the approximate minimum spoke length limitation of FIG. 13.

FIG. 14 is a schematic diagram 1400 depicting the terms of Equation 1. Note that the sum $(r_n+y_n)$ is an approximation for Y to provide relatively simple computation; the 1.15 multiplier term is used to compensate for this approximation. This multiplier is preferably determined empirically.

Figure 15:
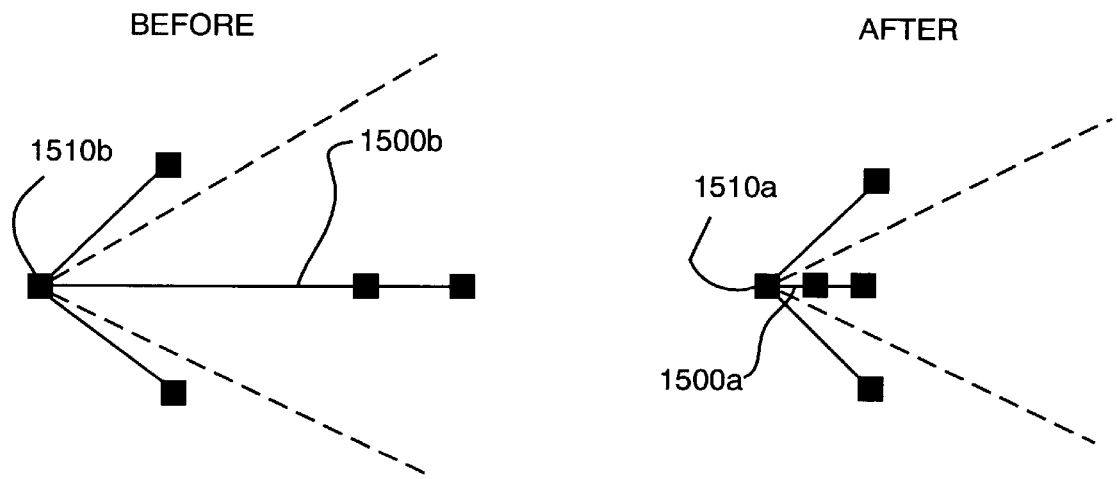
FIG. 15 is a schematic diagram illustrating a second embodiment of an improvement of the novel layout process relating to approximate minimum spoke lengths according to the invention.

In FIG. 15, when shortening the spoke length an object on the spoke (i.e., a "child") may not overlap a grandparent node 1510*a,b* located at the center of the hub. Here, the minimum spoke length for each spoke 1500*a,b* is determined according to Equation 2 as follows:

$$Rs_{min} = r_{gp} + r_n + x_n$$

Figure 16:
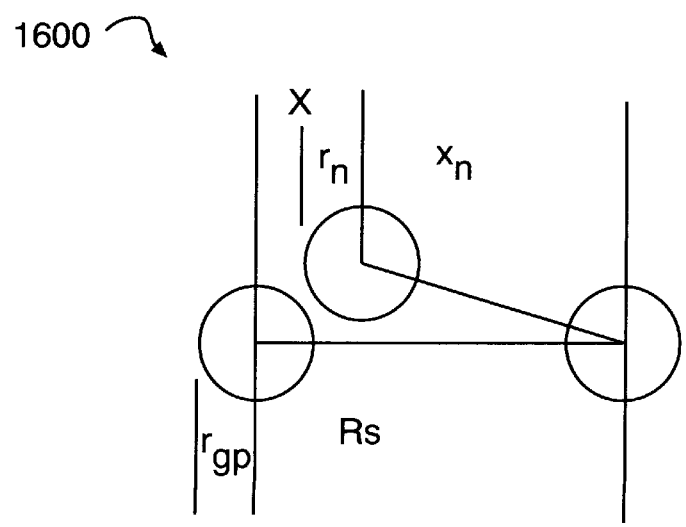
FIG. 16 is a schematic diagram depicting the terms of a second equation used to determine the approximate minimum spoke length limitation of FIG. 13.

FIG. 16 is a schematic diagram 1600 illustrating the terms of Equation 2. Note that the sum $(r_{gp}+r_n)$ is an approximation of X to provide relatively simple calculation.

Calculations using Equation 1 and 2 are performed for each object located at the end of a spoke when each hub is laid-out; the larger $Rs_{min}$ value among these equations becomes the spoke length that is used. These calculations are preferably completed as the layout proceeds from the exterior of the spanning tree toward the interior, yielding a reasonably dense layout without adding significant additional computations to the overall layout operations.

As shown in FIGS. 13 and 15, the calculations used to minimize white spaces are quite effective when the spoke object is relatively large and there is substantial white space on the interior side of the hub. However, individual nodes and small objects tend to remain in their original locations because the sectors they occupy are precisely the correct width (by original calculations). In other words, Equation 1 produces a spoke length that is approximately equivalent to a length calculation without any white space removal. This result is undesirable, particular near the center of a large spanning tree where leaf objects close to that center end up far removed from their parent objects.

In order to obviate this situation, a fourth improvement to the novel layout technique is provided as a refinement of the third improvement previously discussed. According to this additional enhancement, the angle defining each sector is determined by adding a predefined value (e.g., an adder) to each sector angle. Small sectors are thus enlarged in greater proportions to larger sectors. This improvement allows the calculations of Equations 1 and 2 to work effectively for small objects.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently organizing objects displayed on a screen of a network mapping tool, the method comprising the steps of:

generating a connected graph of linked objects within a network atlas of maps, each map comprising a logical page depicting a portion of an inter network computing system;

organizing the connected graph on each logical page such that a collection of related ones of the linked objects is displayable on a window of the screen; and recovering blank space in said graph by minimizing a distance from a center of a parent node object to a center of an associated child node object while ensuring that none of said linked objects overlap each other, wherein an angular position of one linked object relative to another linked object in said graph is calculated by first calculating a first value calculated by dividing a diameter of the one linked object by a length of a connection between the one and the another linked objects, the angular position being based upon a second value calculated by adding to the first value a predefined value.

2. The method of claim 1 wherein the step of generating comprises the step of configuring the connected graph as a hub-and-spoke arrangement.

3. The method of claim 2 wherein the step of organizing comprises the step of grouping the objects near neighboring objects with whom they share links.

4. The method of claim 3 wherein the step of configuring comprises the step of constructing a sparing tree having at least one branch for the connected graph.

5. The method of claim 4 wherein the step of constructing comprises the step of recursively laying-out each branch of the spanning tree starting at a predetermined root node.

6. The method of claim 5 wherein the predetermined root node is located at a mid-point of a longest path through the spanning tree.

7. The method of claim 6 wherein the step of grouping further comprises the step of grouping old leaf nodes with a parent node to form a new leaf node.

8. The method of claim 7 wherein the parent node is located at a center of the new leaf node as a hub node and the old leaf nodes are arranged as spokes along a circular arc surrounding the hub node.

9. The method of claim 8 wherein the step of recursively laying-out each branch further comprises the steps of:

determining whether each hub node has neighbors; and one of if so, creating a new hub object; and if not, returning a pointer to the hub node.

10. The method of claim 9 wherein the step of recursively laying-out each branch further comprises the steps of:

calling a layout member function for each new hub object; and adding the returned pointer to a spoke list of the new hub object.

11. The method of claim 10 wherein the step of recursively laying-out each branch further comprises the step of determining an initial length of a spoke by choosing the larger of one of (i) a sum of radii of all leaf nodes divided by $\pi$ and (ii) a sum of radii of a largest leaf node and its hub node.

12. The method of claim 11 wherein the step of recursively laying-out each branch further comprises the step of calculating a sector angle for each spoke and leaf object by dividing the diameter of the leaf by the initial spoke length.

13. The method of claim 12 wherein the step of calculating a sector angle comprises the step of setting an angle of the spoke according to the position of the neighbor spoke and the sector angle.

14. The method of claim 13 wherein the step of configuring comprises the step of saving cartesian coordinates of each node as attributes in an anchor object associated with each node.

15. A method for efficiently organizing objects displayed on a screen of a network mapping tool, the method comprising the steps of:

generating a compact connected graph of linked objects within a network atlas of maps by configuring the connected graph as a hub-and-spoke arrangement along a spanning tree having at least one branch coupled to hub and spoke objects, each map comprising a logical page depicting a portion of an internetwork computing system;

organizing the connected graph on each logical page by grouping the objects near neighboring objects with whom they share links, such that a collection of grouped objects is displayable on a window of the screen;

recursively laying-out each branch of the spanning tree starting at a predetermined root node located at a mid-point of a longest path through the spanning tree; and recovering blank space in said graph by minimizing a distance from a center of a parent node object to a center of an associated child node object while ensuring that none of said linked objects overlap each other, wherein an angular position of one linked object relative to another linked object in said graph is calculated by first calculating a first value calculated by dividing a diameter of the one linked object by a length of a connection between the one and the another linked objects, the angular positions being based upon a second value calculated by adding to the first value a predetermined value.

16. The method of claim 15 further comprising the step of setting positions of each hub and spoke object on each logical page.

17. The method of claim 16 wherein the step of setting comprises the step of placing the spoke objects along an exterior side of the hub object.

18. The method of claim 17 wherein the step of setting further comprises the step of arranging the spoke objects so that larger objects are closer to a center of the exterior side of the hub object.

19. The method of claim 18 wherein the step of setting further comprises the step of shortening the length of each spoke to a point where a leaf object contacts radial lines of a sector allocated to the leaf object.

20. The method of claim 19 wherein the step of shortening comprises shortening the length of each spoke to a point where a respective leaf object almost overlaps a grandparent node.

* * * * *